(12) United States Patent
Werner

(10) Patent No.: US 6,255,752 B1
(45) Date of Patent: Jul. 3, 2001

(54) MOUNTING FOR A TURBO-MACHINE ROTOR AND ITS USE

(75) Inventor: Stefan Werner, Gallus-Zembroth-Str. (DE)

(73) Assignee: Allweiler AG, Radolfzell (DE)

( * ) Notice: Subject to any disclaimer, the term of this patent is extended or adjusted under 35 U.S.C. 154(b) by 0 days.

(21) Appl. No.: 09/463,503

(22) PCT Filed: Jul. 23, 1998

(86) PCT No.: PCT/EP98/04638

§ 371 Date: Apr. 17, 2000

§ 102(e) Date: Apr. 17, 2000

(87) PCT Pub. No.: WO99/05418

PCT Pub. Date: Feb. 4, 1999

(30) Foreign Application Priority Data

Jul. 26, 1997 (DE) .............................................. 197 32 316

(51) Int. Cl.$^7$ .............................. H02K 7/09; F04B 17/00
(52) U.S. Cl. ........................................... 310/90.5; 417/365
(58) Field of Search .......................... 310/90.5; 417/365, 417/375, 405, 410.1, 423.12

(56) References Cited

U.S. PATENT DOCUMENTS

| | | | |
|---|---|---|---|
| 3,512,851 | * | 5/1970 | Love ................................... 310/90.5 |
| 5,117,448 | * | 5/1992 | Penato et al. ......................... 378/132 |
| 5,182,533 | * | 1/1993 | Ritts ..................................... 335/306 |
| 5,310,311 | * | 5/1994 | Andres et al. ....................... 415/229 |
| 5,506,459 | * | 4/1996 | Ritts .................................... 310/90.5 |
| 5,507,629 | * | 4/1996 | Jarvik ................................. 310/90.5 |

* cited by examiner

*Primary Examiner*—Nestor Ramirez
*Assistant Examiner*—Dang Dinh Le
(74) *Attorney, Agent, or Firm*—Bachman & LaPointe, P.C.

(57) ABSTRACT

The invention relates to a mounting for a turbo-machine rotor. Said mounting is characterized in that radial support of the rotor is assured by one or more permanent magnet bearings. One or more single-thrust sliding bearings provide axial support. The permanent magnet bearings also serve as a lifting device for the sliding surfaces of the hydrodynamic sliding bearings. A force, acting in the opposite direction from the axial force, is generated by axial displacement of the rotor-sided bearing elements of the permanent magnet bearing, in relation to the housing-sided bearing elements, counter to the direction of axial force. This force separates the sliding surfaces of the hydrodynamic sliding bearings from each other in the stopping phases of the rotor. Once it has come to a stop, and when it is in the starting and stopping phases, the rotor is guided by one or more sliding or rolling bearings. These are so configured that, at low rotational speed and when at a standstill, they have a substantially lower moment of friction than the hydrodynamic sliding bearings used in the mounting.

20 Claims, 2 Drawing Sheets

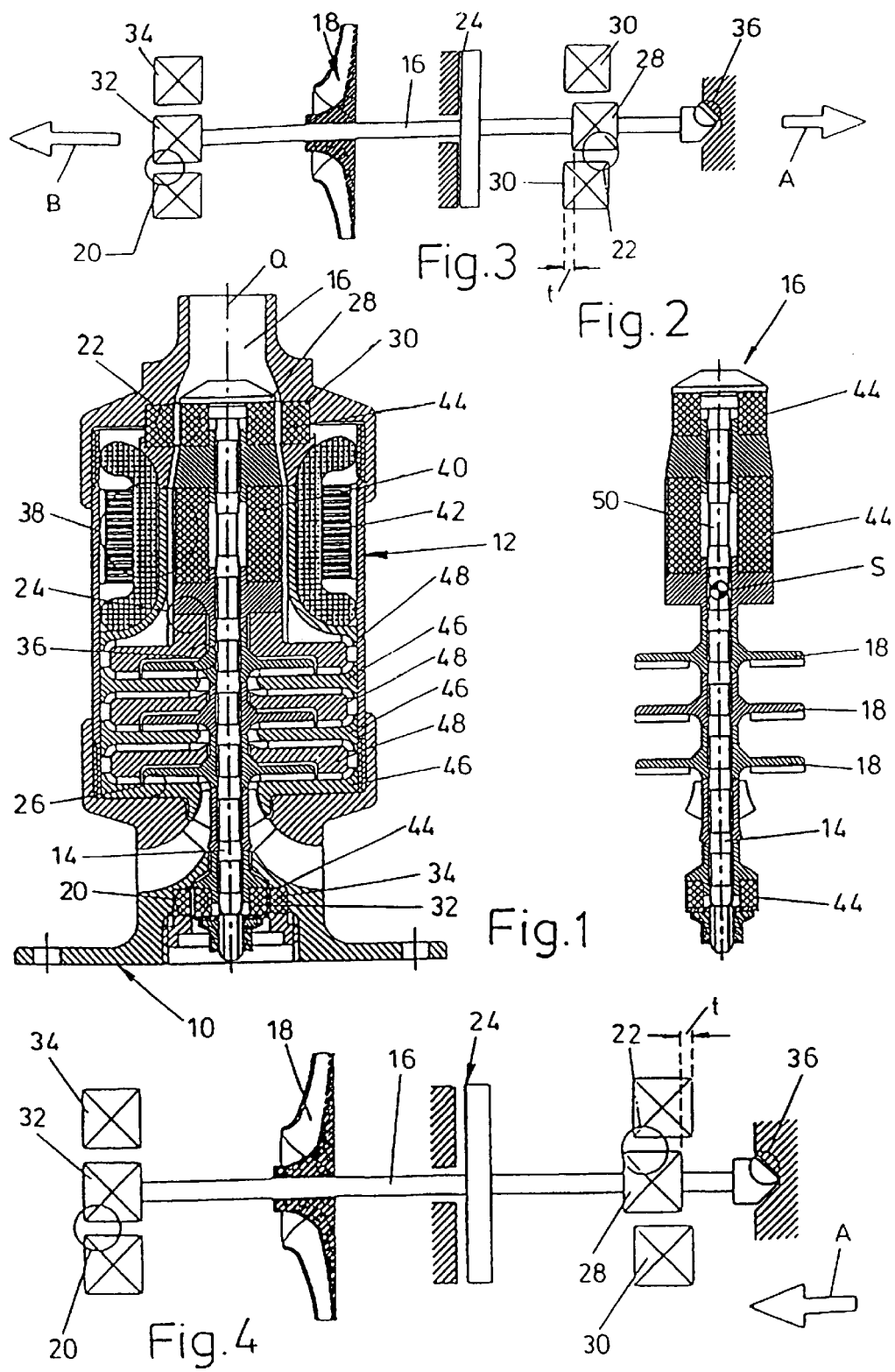

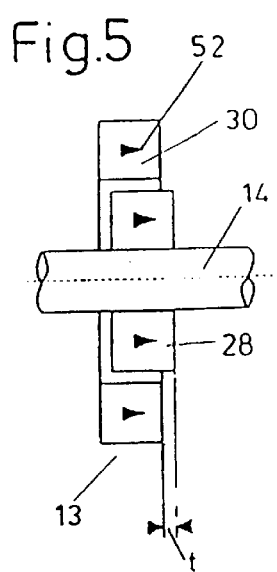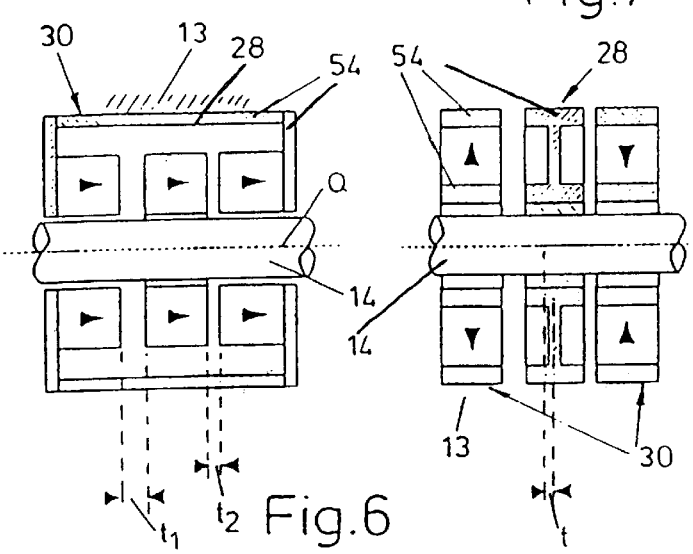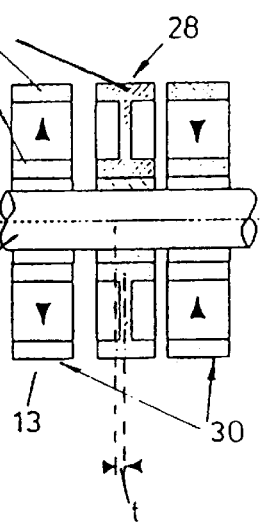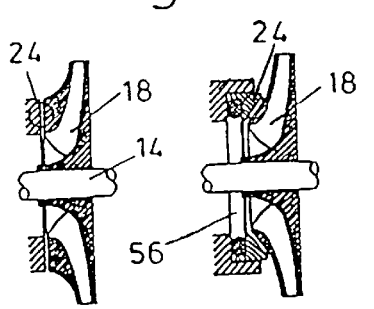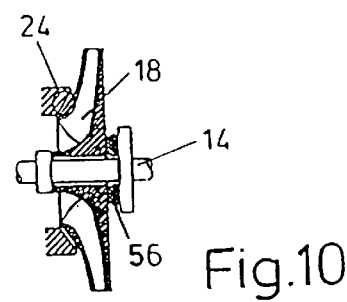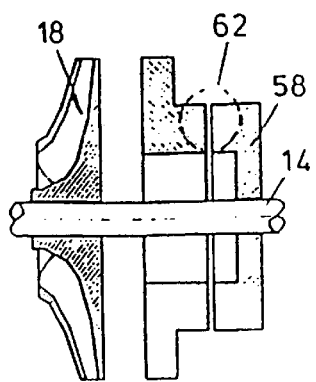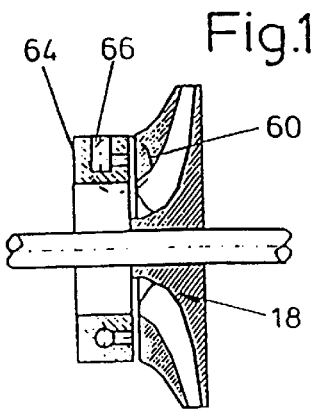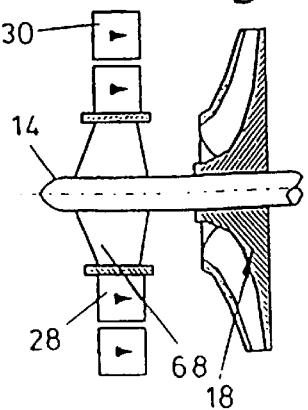

MOUNTING FOR A TURBO-MACHINE ROTOR AND ITS USE

The invention concerns a bearing arrangement for a rotor of a fluid flow machine having at least one permanent magnet bearing for radial guidance and at least one hydrodynamic plain bearing—which carries the axial thrust of the fluid flow machine—for axial—or for axial and radial—guidance in the operating phase. The invention also concerns a use of the fluid flow machine.

It is known for the lubrication of rolling and plain bearing in fluid flow machines or turbines to be effected in many cases by the flow medium itself. The service life of the bearings lubricated in that way can be increased when using wear-resistant bearing materials such as for example silicon nitride in rolling bearings or silicon carbide in plain bearings.

The use of hydrodynamic and hydrostatic plain bearings results in a bearing arrangement without contact of the sliding surfaces in the operating phase and thus affords a bearing arrangement with a low degree of wear. Contact-free bearing arrangements are also represented by the use of electrical or magnetic forces—for example in active magnetic bearings in accordance with WO 95/13477—in bearings with superconductor materials or in permanent magnet bearings. In that respect, no lubricant is necessary to achieve the support action. Permanent magnet bearings are always used in conjunction with other kinds of bearings as, in accordance with Earnshaw's law, it is not possible for a static body to be stably supported in all three directions in space exclusively by means of permanent magnets. In most cases they are used in combination with an active magnetic bearing. Moreover in regard to active magnetic bearings there are constructions in which the rotor is radially guided by rolling bearings in the starting and stopping or run-down phases in order to suppress rotor oscillations.

Hydraulic compensating devices such as for example compensating plates which with the flow medium produce an axial thrust compensation effect are also known. To promote the axial thrust compensation effect in transient operating phases, EP 0 355 796 describes the combination of axial thrust compensation with an active magnetic arrangement. A combination of a device for axial thrust compensation with a lifting device which, by means of permanent magnets, prevents contact of the load-relief plates in the stopped condition, is to be found in EP 0 694 696. The permanent magnets in that case do not have a bearing function.

The known bearing structures suffer from a number of disadvantages. Rolling and plain bearings are heavily loaded when involving lubrication by means of media which have a poor lubricating action—for example which are of very low viscosity—and they attain only short operating lives or often have to be maintained or replaced. Other bearings suffer from the disadvantage that additional technical complication and expenditure is required for satisfactory operation of the bearings upon starting up and in part also in operation thereof: hydrostatic plain bearings require a pressure source which—for example when the bearings are used in pumps—can admittedly in the operating phase also be represented by the pump itself, but which must be present as an external component for the starting phase. A similar consideration applies in regard to hydrodynamic plain bearings whose high starting moment often has to be compensated by suitable technical measures, for example hydrostatic starting. Hydraulic compensating devices in previous design configurations also require technical arrangements, for example additional bearings, in order to compensate for the axial thrust force of the fluid flow machine in the transient operating phases and in order to prevent high starting moments, for example due to compensating plates being in contact. Active magnetic bearings require electrical power for them to operate and they need active regulation as well as additional auxiliary bearings to cover the case of failure of the magnetic bearings.

When using superconductor magnetic bearings, for example when using cryogenic—intensively cold—flow media, additional complication and expenditure is necessary in order to ensure the correct position of the rotor at temperatures above the superconducting phase of the superconductors. When using cryogenic media, with many of the above-mentioned bearings there is the risk of the rotor jamming due to impurities contained in the cryogenic medium becoming frozen on, while the machine is in the stopped condition.

In consideration of those factors the inventor set himself the aim of providing a low-wear bearing arrangement for rotors of fluid flow machines or turbines, which do not have a lubricant apart from the flow medium, wherein the rotor bearing arrangement is to be distinguished in terms of implementation thereof by a low starting torque and a low level of technical complication and expenditure.

That object is attained by the teaching of the independent claim; the appendant claims set forth desirable developments. The scope of the invention also embraces all combinations consisting of at least two of the features disclosed in the description, the drawing and/or the claims.

In accordance with the invention, in the operative position of the rotor the components of one or more permanent magnet bearing or bearings on the rotor are displaced with respect to the associated components on the housing side axially in opposite relationship to the direction of the axial thrust of the fluid flow machine out of the position of force equilibrium, and there is produced a force which is directed in opposite relationship to the axial thrust and which provides that the sliding surfaces of the hydrodynamic bearings which are operative in the operative phase are separated from each other during the starting phase and the rotor is pressed against one or more additional plain or rolling bearings; the latter provide for guidance of the rotor during the starting and stopping phases and are structurally such that, at low speeds of rotation and in the stopped condition, they have a substantially lower moment of friction than the hydrodynamic plain bearings used in the bearing arrangement.

In accordance with the invention therefore the rotor is guided radially by means of one or more permanent magnet bearings. Axial guidance is effected by one or more hydrodynamic plain bearings which act on one side, wherein the rotor of the fluid flow machine is pressed against the bearing or bearings by the axial thrust which occurs in the operating phase. If the hydrodynamic bearings are of a suitable configuration, it is also possible for radial forces to be carried by the hydrodynamic plain bearings in operation of the machine. The permanent magnet bearings serve at the same time as a lifting device for the sliding surfaces of the hydrodynamic plain bearings.

Axial displacement of the bearing elements on the rotor side relative to the bearing elements on the housing side produces a force which is directed in opposite relationship to the axial thrust and which separates the sliding surfaces of the hydrodynamic bearings from each other in the run-down or stopping phases. In the stopped condition and during the starting and stopping phases the rotor is guided by one or more plain or rolling bearings which, at low speeds of rotation and in the stopped condition, have a substantially lower frictional moment than the hydrodynamic bearings used; that minimises the starting torque of the flow machine.

For the purpose of achieving axial displacement of the rotor into the operative position in the starting phase with a low level of technical complication and expenditure, the above-mentioned axial displacement of the rotor is preferably so limited that the magnetic forces of the permanent magnet bearings which occur remain lower in the axial direction than the minimum axial thrust of the machine in operation thereof. As a result, when starting up, the rotor automatically moves into the operative position.

If limitation of the axial displacement of the rotor is not possible or is not wanted, the rotor or the auxiliary bearing, in accordance with the invention, can be displaced during the starting phases by means of an additional device—for example an electromagnet—axially in the direction of the hydrodynamic bearing or bearings until the axial thrust of the fluid flow machine exceeds the axial magnetic forces of the permanent magnet bearings and the rotor automatically moves into the operative position.

To support a rotor of a fluid flow machine with a gaseous flow medium or a flow medium of very low viscosity, the invention also proposes that the hydrodynamic plain bearings may be in the form of aerodynamic plain bearings.

To simplify the structure involved and to reduce the gap losses, the hydrodynamic plain bearings in accordance with another feature of the invention can be connected to cover plates or disks of closed impellers. The lubrication gaps then serve at the same time as sealing gaps for the impellers. In that respect, it has proven desirable for the sliding surface, on the rotor side, of at least one hydrodynamic plain bearing to be integrated into the face of an impeller with a cover plate or disk, and for the plain bearing at that location to be caused to form a seal in respect of the high-pressure side of the impeller in relation to the low-pressure side.

In accordance with a further feature of the invention the rotor can be supported radially by the permanent magnet bearings and there can be provided a hydrodynamic axial or thrust bearing near the center of gravity of the rotor; an auxiliary bearing—in particular a cone-type plain bearing may be arranged near the center of gravity of the rotor. Advantageously, the auxiliary bearing can be integrated into the rear of an impeller.

It is also in accordance with the invention for the rotor of an electric motor driving the fluid flow machine—for example an electric motor in the form of a synchronous motor with permanent magnet excitation—to be integrated into the rotor of the fluid flow machine.

For reasons of longer service lives, a further feature of the invention provides that bearing or magnet rings of the permanent magnet bearings, possibly also an excitation magnet or a magnet ring of the electric motor, are protected by preferably electrically conducting protective rings. At particularly high speeds of rotation, the magnet rings on the rotor side should be protected with particularly strong, low-weight banding or retaining rings—for example of carbon fiber-reinforced plastic material.

It has also proven to be advantageous to associate at least one hydrostatic plain bearing or a hydraulic compensating device with the hydrodynamic plain bearing in assisting relationship therewith or to replace the hydrodynamic plain bearing by a hydrostatic plain bearing or a hydraulic compensating device. In accordance with the invention a front-end or intake impeller can also be provided in a magnetic bearing. The intake impeller is then fixed within the bearing ring on the rotor side.

The advantages achieved with the invention lie in particular in the low level of technical complication and expenditure with which a low-wear bearing arrangement which is distinguished by a long service life can be implemented. There is no need for a feed of electrical or hydraulic power and there is also no need for a regulating device for operation of the bearing arrangement. The bearing arrangement can be produced with few components, using simple manufacturing technology, and being of low weight. When an individual aerodynamic bearing is used for axially supporting the rotor, there is no need for an additional resilient supporting arrangement of a sliding surface or elements thereof.

The bearing arrangement permits small gap clearances and thereby makes it possible to minimise gap losses, in particular in the case of fluid flow machines involving flow media of very low viscosity. In operation of a fluid flow machine with cryogenic media, the risk of impurities becoming frozen on in the stopped condition is minimised by the rotor bearing arrangement according to the invention because the pump gaps are enlarged in the stopped condition in comparison with the operative condition and contact between the rotor and the housing occurs only in the region of the auxiliary bearings. Support for the rotor by axially and radially acting auxiliary bearings during the starting and stopping phases makes it possible to pass through oscillation-critical ranges of speed of rotation of the permanent magnet bearings, without involving criticality.

Liquid hydrogen is of very low viscosity and is a very poor lubricant and therefore imposes particular demands on the bearing arrangement of fluid flow machines which operate with that medium. Due to the very low operating temperatures, lubrication for the bearings by means of an additional lubricant is not possible as the lubricant would be converted into the solid phase. In space travel, hitherto operation has mainly been implemented with conventional plain or rolling bearings, the high level of wear of which could be tolerated in regard to the short operating periods and service lives which occur. That wear is problematical in regard to planned uses for liquid hydrogen as a propellant in air travel and other areas.

The bearing arrangement in accordance with the invention for the centrifugal or rotary pump set forth makes a contribution to increasing the service life and operational readiness of flow machines which operate with liquid hydrogen.

Further advantages, features and details of the invention will be apparent from the following description of preferred embodiments and with reference to the drawing in which:

FIG. 1 is a view in longitudinal section of a pump for conveying liquid hydrogen with a bearing arrangement according to the invention for the rotor in the operative position, FIG. 2 shows the rotor of the pump shown in FIG. 1, FIG. 3 is a diagrammatic view showing the rotor bearing arrangement according to the invention in the operative position, FIG. 4 is a diagrammatic view of another rotor bearing arrangement in the rest position, FIG. 5 through 7 show three diagrammatic views relating to different permanent magnet bearings in longitudinal section, FIG. 8 through 10 show embodiments of the integration of a hydrodynamic plain bearing into an impeller with a cover plate of a pump, FIG. 11 is a view in longitudinal section of a hydraulic compensating device, FIG. 12 is a view in longitudinal section of a hydrostatic plain bearing, and FIG. 13 is a view in longitudinal section through a permanent magnet bearing with integrated front-end or intake impeller.

A centrifugal or rotary pump 10 as shown in FIG. 1 is designed especially as an immersed pump for the delivery of liquid hydrogen. It operates submerged in a medium to be conveyed and in a housing 12 has a perpendicularly disposed rotor shaft 14 of a rotor 16 which is again shown separately in FIG. 2. Arranged on the rotor 16 are three half-open impellers 18 for conveying the medium and for increasing the pressure of the medium.

The rotor 16 is radially supported by permanent magnet bearings 20, 22. A hydrodynamic thrust bearing 24 is disposed in the proximity of the center of gravity S of the rotor 16. It is a type of design for an aerodynamic plain bearing, with a supporting gap of about 1 $\mu$m. That provides an adequate supporting force with the lubricant liquid hydrogen. As in the described pump the radial stiffness of the magnetic bearings 20, 22 is very low with respect to the axial stiffness of the thrust bearing 24, it is possible to forego the resilient supporting arrangement, which is usual with very small supporting gaps, in respect of one of the sliding surfaces or its elements. The small supporting gap of the thrust bearing 24 and its high level of axial stiffness permit very accurate setting of the gaps 26 between the blades of the half-open impellers 18 and the walls of the housing. It is possible in that way to minimise the gap losses. In the operative position of the rotor 16, a rotor-side bearing ring or inner magnetic ring 28 of the upper magnetic bearing 22 is displaced upwardly by about 0.1 mm with respect to its outer magnetic ring 30 as the housing-side bearing ring, so that the necessary force for lifting the rotor 16 from the plain bearing 24 in the stopping phase is produced. Corresponding bearing or magnetic rings 32, 34 of the lower magnetic bearing 20 do not involve any displacement in the operative condition.

An auxiliary bearing 36 for limiting the axial movement of the rotor 16 is also disposed in the proximity of the center of gravity S of the rotor 16. It is integrated in the form of a cone-type plain bearing into the rear of the last impeller 18 and also radially supports the rotor 16 in the starting and stopping phases; radial support for the rotor 16 by the auxiliary bearing 36 and the arrangement thereof in the proximity of the center of gravity of the rotor 16 make it easier to pass through the first rigid-body mode of the rotor 16 at lower speeds of rotation.

The rotor of an electric motor 38 which drives the pump and which is in the form of a synchronous motor with permanent magnet excitation was integrated into the rotor 16 of the pump 10. A large air gap between the exciter magnet 40 and the iron return member 42 and the iron-less design of the electric motor 38 on the rotor side guarantee low unstable forces for the electric motor 38 in the radial direction so that radial support for the rotor 16 by the permanent magnet bearings 20, 22 is possible, with a relatively low level of radial stiffness. The large air gap additionally permits the entire delivery flow to be passed through the gap, thereby guaranteeing good cooling for the electric motor 38. The magnetic rings 28, 30, 32, 34 of the bearings 22 and 20 respectively and the exciter magnet or magnetic ring 40 of the electric motor 38 are protected from damage by metal protection or shroud rings 44. The latter additionally serve to damp rotor oscillations as damping eddy currents are induced therein upon oscillations of the rotor 16 by the fields of the magnets.

In order to increase the resistance to wear—and to minimise the weight of the pump 10—individual components of the rotor 16 such as impellers 18 and intermediate disks or plates 45 as well as housing plates or disks 46, 48 can be made from ceramic. The ceramic components of the rotor 16 are held together by a tie bolt 50. The flexural loadings acting on the rotor 16 during operation of the machine are carried by the boss cross-sections of the components as compression forces.

The diagrammatic view in FIG. 3 for the bearing arrangement according to the invention shows the rotor 16 of a fluid flow machine with impeller 18 which is supported in radially contact-free manner by means of the permanent magnet bearings 20, 22. In the operating phase of the machine the impeller 18 generates a thrust in the axial direction, which is carried by the hydrodynamic plain bearing 24. The components 28 of the magnetic bearing 22 on the rotor 16, upon abutment thereof against the hydraulic plain bearing 24, are arranged displaced with respect to the components 30 of the magnetic bearing 22 on the housing side axially towards the auxiliary bearing 36 by a dimension t so that, by virtue of the unstable characteristic of the bearing forces of the permanent bearing magnet 22 in the axial direction, there is a magnetic force A in the axial direction, which is in opposite relationship to the thrust force B of the impeller 18. When the rotor 16 is lifted off the plain bearing 24, at the permanent magnet bearing 20 there is also an axial displacement of the components 32 on the rotor side with respect to the components 34 on the housing side. The resulting forces in the axial direction of the magnetic bearings 20, 22 increase with an increasing spacing of the rotor 16 from the plain bearing 24.

The axial displacement of the bearing components is limited by the auxiliary bearing 36 which in FIG. 3 is in the form of a cone-type plain bearing. The rotor 16 of the fluid flow machine is freely movable between the conditions of abutment against the bearings 24 and 36. The arrangement of the bearing elements of the bearings 20, 22, 24, 36 is such that the axial force generated by the permanent magnet bearing 22 is sufficiently great to lift the rotor 16 off the hydrodynamic plain bearing 24 in the stopping phase of the machine. The displacement of the rotor 16 is limited by the auxiliary bearing 36 so that the minimum axial thrust generated by the impeller 18 in the operative phase is greater than the maximum force generated in the axial direction by the permanent magnet bearings 20 and 22 and which occurs when the rotor 16 abuts against the auxiliary bearing 36. That ensures that in operation the rotor 16 lifts off the auxiliary bearing 36 and is supported axially by the hydrodynamic plain bearing 24 without contact between the sliding surfaces. In the stopping phase the rotor 16 is lifted off the hydrodynamic bearing 24 again by the magnetic forces and is pressed against the auxiliary bearing 36. A suitable choice in respect of the bearing materials and a small diameter for the auxiliary bearing 36 ensure a low starting torque for the bearing arrangement.

In the embodiment shown in FIG. 4 the rotor 16 is in the rest position and the rotor-side inner magnetic ring 28 of the magnetic bearing 22 projects on the impeller side by the dimension t. In this case, the magnetic force A is in a direction towards the impeller 18. Here, the magnetic force A urges the rotor 16 out of the auxiliary bearing 36 into the operative position. The drawing does not show that a lifting device such as an electromagnetic unit is required for lifting the arrangement out of the operative position.

FIG. 5 diagrammatically shows on a rotor axis or shaft 14 a magnetic or bearing ring 28 near to the rotor, with an outer magnetic or bearing ring 30 which surrounds same and which is axially displaced by that dimension t; therein the magnetisation direction is indicated by arrows 52. This bearing arrangement is based on the repulsion forces of the magnets 28, 30.

In the case of bearings as shown in FIG. 6 which operate with shearing forces, the magnetic rings 28, 30 on the rotor and housing sides are generally disposed at the same height, that is to say not inwardly or outwardly, that is to say at different spacings relative to the longitudinal axis Q.

In the case of so-called reluctance bearings as shown in FIG. 7, the supporting action can also be achieved if magnets are arranged only on the housing side or only on the rotor side. In that case, only ferromagnetic material—generally iron 54—is provided on the opposite side. The fixing to the housing 12 is indicated in broken line at 13.

In the drawing the dimension t of the displacement is determined by the magnetic rings 28, 30 of a magnetic bearing. In FIG. 6 the dimension t is defined by way of the two spacings t1 and t2 which can be seen therein: t=(t1−t2)/2.

FIGS. 8 through 10 diagrammatically show the integration of a hydrodynamic plain bearing 24 into an impeller 18 with a cover plate or disk. A major advantage of integrating the plain bearing 24 into an impeller 18 is its particular sealing action—similarly to that of a sliding ring seal with hydrodynamically repelling sliding surfaces—and thus the suitability of the plain bearing 24 as a slit-type or labyrinth seal for the impeller 18.

FIG. 8 shows the integration of a hydrodynamic plain bearing 24 which has a purely axial effect, into a closed impeller 18. When aerodynamic plain bearings are integrated into a plurality of impellers 18 of a rotor 16, all plain bearings, except for one, must be constructed with resiliently supported sliding or bearing surfaces. Suspending the rotor 16 with a low degree of stiffness by virtue of the permanent magnet bearings 20, 22 can be utilised only for an individual plain bearing, to compensate for positional errors in respect of the sliding surfaces. In FIG. 9 the sliding surface on the housing side and in FIG. 10 the sliding surface on the impeller side of the plain bearing 24—in this case the entire impeller 18—is shown as being resiliently supported.

FIGS. 9 and 10 each show at 56 an elastic ring, while in addition the hydrodynamic bearings 24 in FIGS. 9 and 10 are in the form of cone or taper bearings. In that way it is additionally possible to achieve highly precise radial guidance for the rotor 16 in operation as well as precise axial guidance.

FIGS. 11 and 12 each diagrammatically show an example of a hydraulic compensating device—compensating plate or disk 58 (FIGS. 11)—and for a hydrostatic plain bearing 60. Reference 62 in FIG. 11 denotes an annular gap while reference 64 in FIG. 12 denotes a bearing disk with pressure feed 66.

In FIG. 11 the compensating disk 58 is subjected in operation on the impeller side to the action of the delivery pressure, while the other side is subjected to the action of the ambient pressure or a lower stage pressure. The annular gap 62 is of such a size that in the operative phase a movement of the impeller 18 due to the axial thrust in the direction of the suction or intake side results in a reduction in the gap width and the resulting increase in pressure in the gap provides for compensation in respect of the axial thrust, without the gap width falling below a minimum value.

The hydrostatic plain bearing 60 in FIG. 12 can be disposed for example on the impeller 18 of the first stage. The supply of pressure for the plain bearing 60 can be implemented in the operative phase by returning the stage pressure from a higher stage.

FIG. 13 shows the integration of a front-end or intake impeller 68 into the interior of a magnetic bearing 28, 30. This arrangement saves on space, it optimises the feed of the medium being conveyed (axial feed: improved suction intake capability), while the impeller 68 is less sensitive to radial displacement of the rotor 16. The same is also possible for a normal axial impeller.

What is claimed is:

1. A fluid flow apparatus, comprising:
    a fluid flow machine assembly including a rotor and at least one impeller which, in an operating condition, generates an axially directed thrust;
    at least one hydrodynamic plain bearing for carrying said axially directed thrust and for axially guiding said rotor; and
    at least one permanent magnet bearing for radially guiding said rotor, said at least one permanent magnet bearing having a rotor component and a fixed component, said rotor component being displaced axially with respect to said fixed component so as to produce a force opposite to said axially directed thrust.

2. An apparatus as set forth in claim 1, wherein sliding surfaces of said at least one hydrodynamic plain bearing which are operative in said operating condition are separated from each other during a stopped condition and during starting and stopping phases between said operating condition and said stopped condition, and further comprising at least one additional bearing which guides said rotor during said starting and stopping phases, said at least one additional bearing being adapted so that in said stopped condition, said at least one additional bearing has a lower moment of friction than said at least one hydrodynamic plain bearing.

3. An apparatus as set forth in claim 2, wherein said at least one additional bearing and said at least one hydrodynamic plain bearing define an extent of axial displacement of said rotor, and wherein said force of said at least one permanent magnet bearing is less than a minimum axially directed thrust of said fluid flow machine assembly in said operating condition.

4. An apparatus as set forth in claim 1, wherein said rotor component is a rotor-side bearing ring, and wherein said fixed component is a housing-side bearing ring.

5. An apparatus as set forth in claim 1, wherein said fluid flow assembly further includes a motor defining a motor gap, and wherein a flow path for fluid driven by said fluid flow assembly passes through said motor gap.

6. An apparatus as set forth in claim 1, wherein said rotor component and said fixed component define a bearing gap, and wherein a flow path for fluid driven by said assembly passes through said bearing gap.

7. An apparatus as set forth in claim 1, wherein said at least one hydrodynamic plain bearing is an aerodynamic plain bearing.

8. An apparatus as set forth in claim 1, wherein said hydrodynamic plain bearing is connected to a cover disk of an impeller of said fluid flow machine assembly.

9. An apparatus as set forth in claim 8, wherein said at least one hydrodynamic plain bearing has a rotor-side sliding surface and a plain bearing, wherein said rotor side sliding surface is integrated into said impeller, and wherein said rotor-side sliding surface and said plain bearing are sealing with respect to a high pressure side and a low pressure side of said impeller.

10. An apparatus as set forth in claim 1, wherein said rotor is radially supported by said at least one permanent magnet bearing, and wherein said hydrodynamic thrust bearing is positioned substantially adjacent to a center of gravity of said rotor.

11. An apparatus as set forth in claim 10, further comprising an auxiliary bearing provided substantially adjacent to said center of gravity of said rotor, wherein said auxiliary bearing is a cone plain bearing.

12. An apparatus as set forth in claim 11, wherein said auxiliary bearing is integrated into a rear surface of said impeller.

13. An apparatus as set forth in claim 1, wherein said at least one hydrodynamic plain bearing is an aerodynamic plain bearing having a supporting gap of about 1 μm.

14. An apparatus as set forth in claim 1, further comprising an electric motor for driving said fluid flow machine assembly, said electric motor having a motor rotor which is integrated into said rotor of said fluid flow machine assembly.

15. An apparatus as set forth in claim 14, wherein said electric motor is a synchronous motor having permanent magnet excitation.

16. An apparatus as set forth in claim 15, further comprising protective rings for protecting bearing rings of said at least one permanent magnet bearings and magnetic rings of said electric motor.

17. An apparatus as set forth in claim 16, wherein said protective rings are provided from a material selected from the group consisting of carbon fiber-reinforced plastic material, glass fiber-reinforced plastic material and combinations thereof.

18. An apparatus as set forth in claim 1, wherein at least one of said rotor and said impeller are made from ceramic material.

19. An apparatus as set forth in claim 1, wherein said at least one hydrodynamic plain bearing comprises bearing surfaces which, in said operating condition, axially guide said rotor without contact between said bearing surfaces.

20. An apparatus as set forth in claim 1, further comprising at least one of a hydrostatic plain bearing and a hydraulic compensating device supportingly associated with said at least one hydrodynamic plain bearing.

* * * * *